(12) United States Patent
Lee (10) Patent No.: US 12,472,963 B2
(45) Date of Patent: Nov. 18, 2025

(54) METHOD AND APPARATUS OF CORRECTING STEERING OF DRIVING VEHICLE ASSOCIATED WITH AUTONOMOUS DRIVING

(71) Applicant: HL MANDO CORPORATION, Gyeonggi-do (KR)

(72) Inventor: Jaewoo Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 296 days.

(21) Appl. No.: 18/095,516

(22) Filed: Jan. 10, 2023

(65) Prior Publication Data
US 2024/0101131 A1    Mar. 28, 2024

(30) Foreign Application Priority Data
Sep. 26, 2022  (KR) .................. 10-2022-0121694

(51) Int. Cl.
*B60W 50/08*    (2020.01)
*B60W 60/00*    (2020.01)

(52) U.S. Cl.
CPC ........ *B60W 50/082* (2013.01); *B60W 60/005* (2020.02); *B60W 2540/18* (2013.01); *B60W 2710/207* (2013.01); *B60W 2720/24* (2013.01)

(58) Field of Classification Search
CPC .. B60W 50/082; B60W 50/08; B60W 60/005; B60W 60/0053; B60W 2540/18; B60W 2710/207; B60W 2710/20; B60W 2720/24; B60W 10/20; B60W 2050/0063; B60W 2050/0073; B60W 2510/202; B62D 15/025; B62D 5/0457; B62D 6/002; B62D 6/10

USPC ........................................................ 701/23
See application file for complete search history.

(56) References Cited

U.S. PATENT DOCUMENTS

| 2007/0284180 | A1* | 12/2007 | Suehiro | B62D 5/0469 |
| | | | | 180/444 |
| 2015/0120142 | A1* | 4/2015 | Park | B62D 15/025 |
| | | | | 701/41 |
| 2016/0229445 | A1* | 8/2016 | Sasaki | B62D 5/0484 |
| 2018/0181132 | A1 | 6/2018 | Kunihiro et al. | |

(Continued)

FOREIGN PATENT DOCUMENTS

JP    2019-130989    8/2019

OTHER PUBLICATIONS

Shwetha et al., Modeling, simulation and implementation of a proportional-derivative controlled column-type EPS, International Journal of Enhanced Research in Science Technology & Engineering, Sep. 2013, vol. 2, Issue 9, pp. 10-19.*

(Continued)

*Primary Examiner* — Andrew R Dyer
(74) *Attorney, Agent, or Firm* — WOMBLE BOND DICKINSON (US) LLP (57) ABSTRACT

A method and an apparatus of correcting steering of a driving vehicle associated with autonomous driving determine a current driving mode of the driving vehicle among a plurality of driving modes, determine whether a driver performs the steering of the driving vehicle when the determined current driving mode is an autonomous driving mode, set an additional target rack position input to a road wheel actuator, and correct a steering direction of the driving vehicle.

20 Claims, 9 Drawing Sheets

(56) References Cited

U.S. PATENT DOCUMENTS

| | | | |
|---|---|---|---|
| 2021/0009194 A1* | 1/2021 | Kim | B62D 15/025 |
| 2021/0146960 A1* | 5/2021 | Jung | B60W 30/10 |
| 2022/0017143 A1 | 1/2022 | Shoji et al. | |
| 2022/0063716 A1* | 3/2022 | Kim | B62D 6/00 |
| 2022/0227419 A1* | 7/2022 | Farooqi | B62D 15/025 |
| 2022/0289173 A1* | 9/2022 | Matsuda | B60W 40/13 |
| 2022/0289277 A1* | 9/2022 | Narasimhan | B62D 5/001 |
| 2023/0126269 A1* | 4/2023 | Kim | B60W 60/0015 |
| | | | 701/23 |
| 2024/0034364 A1* | 2/2024 | Urano | G05D 1/0088 |

OTHER PUBLICATIONS

Office Action dated May 30, 2024 for Korean Patent Application No. 10-2022-0121694 and its English translation provided by Applicant's foreign counsel.

\* cited by examiner

METHOD AND APPARATUS OF CORRECTING STEERING OF DRIVING VEHICLE ASSOCIATED WITH AUTONOMOUS DRIVING

CROSS REFERENCE TO RELATED APPLICATION

This application claims priority from and benefits of Korean Patent Application No. 10-2022-0121694, filed on Sep. 26, 2022, which is hereby incorporated by reference for all purposes as if fully set forth herein.

TECHNICAL FIELD

The present disclosure generally relates to a method and apparatus of correcting steering of a driving vehicle associated with autonomous driving, and to a method and apparatus for the driving vehicle to correct steering of a driving vehicle by reflecting the driver's will to steer during autonomous driving.

BACKGROUND

A Steer-By-Wire (SBW) system may refer to an electric signal type intelligent steering system that transmits a driver's will to steer a vehicle with an electric signal to control the vehicle without a mechanical connection between a steering wheel and a vehicle wheel.

The SBW system, which meets the demand for common parts with a layout that is free from a flow of vehicles changing from transportation to mobility space and can be applied to various vehicle platforms, is attracting attention as a future steering device.

However, because unlike general-purpose or conventional steering devices, in the SBW, the system is not mechanically connected, a steering wheel feedback actuator and a road wheel actuator included in the SBW are actuated according to different inputs, respectively.

Here, the steering wheel actuator and the road wheel actuator may have the same system direction at high speed, and thus, one of the steering wheel actuator and the road wheel actuator becomes a main system and the other is controlled be a value matching the system output. In this case, the road wheel actuator moves according to the driver's will to steer the vehicle under normal driving conditions, but this may be a problem in an autonomous driving mode.

That is, in the autonomous driving of the driving vehicle, the steering wheel actuator moves by calculating the movement of the road wheel actuator depending on driving situations. In this case, when the driver finely steers the steering wheel, the general-purpose steering device can reflect the driver's will to steer, but in the case of the SBW, an additional function is required.

Therefore, while the driving vehicle is in the autonomous driving mode, there is a need for a technology to correct the function by reflecting the driver's will to steer of the vehicle in the SBW.

The above-mentioned background art is technical information possessed by the inventor for the derivation of the present disclosure or acquired during the derivation of the present disclosure, and cannot necessarily be said to be a technique known to the general public prior to the filing of the present disclosure.

SUMMARY

An object to be solved through some embodiments of the present disclosure is to provide a method and an apparatus for determining a driving mode of a vehicle and correcting steering by compensating for a driver's will to steer when the vehicle is autonomous driving.

An object to be solved through some embodiments of the present disclosure is to provide a correction method and apparatus capable of providing a driving vehicle with a correction value which reflects a driver's will to steer the driving vehicle is reflected when the driving vehicle is autonomously driven.

An object to be solved through some embodiments of the present disclosure is to provide a correction method and apparatus for providing a correction value to a road wheel actuator by reflecting a driver's will to steer a vehicle when the vehicle is autonomously driven.

An object to be solved through some embodiments of the present disclosure is to provide a method and an apparatus for providing an accurate correction value through a predetermined equation by reflecting a driver's will to steer a vehicle when the vehicle is autonomously driven.

According to an aspect of the present disclosure, there is provided a method of correcting steering of a driving vehicle related to autonomous driving, the method including: determining a driving mode of a driving vehicle; determining whether a driver performs steering when the driving mode is an autonomous driving mode of the driving vehicle; setting an additional target rack position input to road wheel actuator; and correcting a steering direction of the driving vehicle.

In the aspect, the determining of whether the driver performs the steering may further include predicting a driver torque.

In the aspect, the determining of whether the driver performs the steering may further include comparing the predicted torque and steering determination information to determine whether the driver has the steering will.

In the aspect, the comparing of the predicted torque and steering determination information to determine whether the driver has the steering will may further include determining whether the predicted torque exceeds a first threshold torque amount.

In the aspect, the method may further include comprising determining whether the predicted torque exceeds a second threshold torque amount when the predicted torque exceeds the first threshold torque amount in the determining of whether the predicted torque exceeds the first threshold torque amount.

In the aspect, the method may further include comprising converting a mode of the driving vehicle when the predicted torque exceeds the second threshold torque amount, in which it may be determined that the driver has the steering will.

In the aspect, it may be determined that the driver has the steering will when the predicted torque exceeds the first threshold torque amount in the determining of whether the predicted torque exceeds the first threshold torque amount.

In the aspect, it may be determined that a driver has the steering will when the predicted torque does not exceed the second threshold torque amount.

In the aspect, when it is determined that the driver has the steering will in the determining of whether the driver performs steering, the additional target rack position input to the road wheel actuator may be set based on a torsion bar stiffness.

In the aspect, the additional target rack position input to the road wheel actuator may be calculated by dividing torque applied by the driver of the driving vehicle by the torsion bar stiffness.

In the aspect, the additional target rack position input to the road wheel actuator may be calculated by multiplying a C-factor.

In the aspect, the comparing of the predicted torque and steering determination information to determine whether the driver has the steering will may further include calculating a torque duration applied by the driver of the driving vehicle.

In the aspect, the comparing of the predicted torque and steering determination information to determine whether the driver has the steering will may further include determining whether the torque duration exceeds threshold torque duration.

In the aspect, when the torque duration exceeds the threshold torque duration in the determining of whether the torque duration exceeds the threshold torque duration, it may be determined that the driver has the steering will.

According to the aspects of the present disclosure, the driving vehicle may provide a steering device and a correction device system reflecting the driver's will to steer during autonomous driving.

According to the aspects of the present disclosure, it is possible to provide a correction device that provides an additional input to the road wheel actuator by reflecting the driver's will to steer during autonomous driving of the driving vehicle.

According to the aspects of the present disclosure, it is possible to provide a correction device that can finely adjust the control of vehicle wheels through the road wheel actuator by reflecting the driver's will to steer during autonomous driving of the driving vehicle.

According to the aspects of the present disclosure, it is possible to provide a correction device that more effectively, quickly and accurately corrects wheel movement with less computing resources during autonomous driving by calculating an estimated driver torque (EDP) that reflects the driver's will to steer through a certain equation or instructions.

DETAILED DESCRIPTION

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the technical spirit of the present disclosure is not limited to the following embodiments, but may be implemented in various different forms, and only the following embodiments complete the technical spirit of the present disclosure, and the following embodiments are provided to fully inform those of ordinary skill in the art to which the present disclosure pertains to the scope of the present disclosure, and the technical spirit of the present disclosure is only defined by the scope of the claims.

In adding reference numerals to the components of each drawing, it should be noted that the same components are given the same reference numerals as much as possible even though they are indicated on different drawings. In addition, in describing the present disclosure, if it is determined that a detailed description of a related known configuration or function may obscure the gist of the present disclosure, the detailed description thereof will be omitted.

Unless otherwise defined, all terms (including technical and scientific terms) used herein may be used with the meaning commonly understood by those of ordinary skill in the art to which this disclosure belongs. In addition, terms defined in a commonly used dictionary are not to be interpreted ideally or excessively unless clearly defined in particular. The terminology used herein is for the purpose of describing the embodiments and is not intended to limit the present disclosure. In the present specification, the singular also includes the plural, unless specifically stated otherwise in the phrase.

In addition, in describing the components of the present disclosure, terms such as first, second, A, B, (a), (b), or the like may be used. These terms are only for distinguishing the elements from other elements, and the essence, order, or order of the elements are not limited by the terms. When it is described that a component is "connected", "coupled", or "joined" to another component, the component may be directly connected or connected to the other component, but it should be understood that another component may be "connected", "coupled", or "joined" between components.

As used herein, "comprises" and/or "comprising" means that a recited component, step, operation and/or element does not exclude the presence or addition of one or more other components, steps, operation and/or element.

Hereinafter, various embodiments of the present disclosure will be described in detail with reference to the accompanying drawings.

In addition, in describing the components of the present disclosure, terms such as first, second, A, B, (a), (b), or the like may be used. These terms are only for distinguishing the elements from other elements, and the essence, order, or order of the elements are not limited by the terms. Throughout the specification, when a part "includes" or "has" a certain component, this means that other components may be further included, rather than excluding other components, unless otherwise stated. In addition, terms such as "unit" and "module" described in the specification mean a unit that processes at least one function or operation, which may be implemented as hardware or software or a combination of hardware and software.

Figure 1:
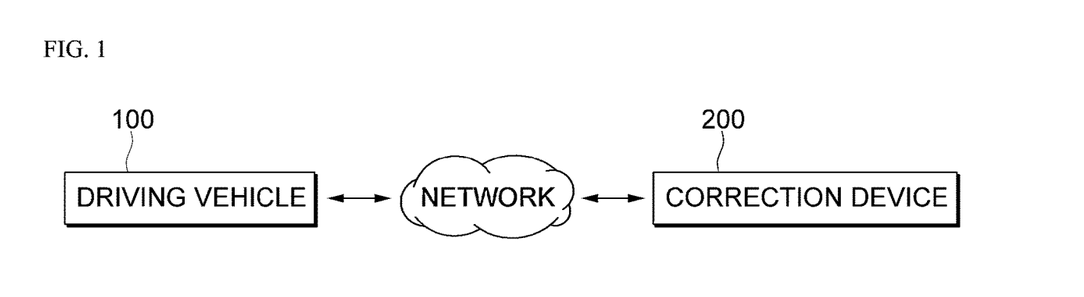
FIG. 1 illustrates an exemplary environment to which a correction apparatus or device according to some embodiments of the present disclosure may be applied.

FIG. 1 illustrates an exemplary environment to which a correction apparatus or device according to some embodiments of the present disclosure may be applied. When a driving vehicle is driven by autonomously driving through a system including a driving vehicle 100 and a correction apparatus or device 200 illustrated in FIG. 1, steering of the driving vehicle may be corrected by reflecting a driver's will to steer the driving vehicle. Through this, even in autonomous driving situations, the driver can secure a control right of the driving vehicle by manipulating a steering wheel in relation to the steering of the driving vehicle.

Hereinafter, operations of the components illustrated in FIG. 1 related to steering correction of a driving vehicle through the above-described system will be described in more detail.

FIG. 1 illustrates an example in which the driving vehicle 100 and the correction apparatus or device 200 are connected through a network, this example is only for convenience of understanding, and the number of devices that can be connected to the network may vary.

Meanwhile, FIG. 1 is only illustrating a preferred embodiment for achieving the object of the present disclosure, and some components may be added or deleted as needed. Hereinafter, the components illustrated in FIG. 1 will be described in more detail.

The correction apparatus or device 200 may determine the mode of the driving vehicle 100, and, when the driving vehicle 100 is in an autonomous driving situation, the correction apparatus or device 200 may correct a driving direction of the driving vehicle 100 by reflecting the driver's will to steer of the driving vehicle 100. Here, the correction device 200 may collect and analyze various information generated or transmitted from the driving vehicle 100.

Various information may include data generated by the driving vehicle 100, for example, but not limited to, a speed of the driving vehicle 100, a wheel angle of a steering device, specifications of the driving vehicle 100 itself, or the like, and various information may include information about the environment in which the driving vehicle is being driven. Such information may be information collected by utilizing various devices included in or associated with the driving vehicle 100 while the driving vehicle 100 is driving, and it would be obvious for a person having ordinary skill in the art that various devices may include any electronic device which the driving vehicle 100 comprises. In addition, such information may include information collected when the vehicle is stopped and is not driving.

The driving vehicle 100 illustrated in FIG. 1 may include not only a vehicle equipped with autonomous driving technology but also a vehicle not equipped with general autonomous driving technology. The driving vehicle 100 may include both a four-wheeled vehicle and a two-wheeled motorcycle.

In order to exclude duplicate description, various operations performed by the correction device 200 will be described in more detail later with reference to the drawings below with reference to FIG. 3.

Meanwhile, the correction device 200 may be implemented as one or more computing devices. For example, all functions of the correction device 200 may be implemented in a single computing device. As another example, a first function of the correction device 200 may be implemented in a first computing device, and a second function may be implemented in a second computing device. Here, the computing device may be a notebook, a desktop, a laptop, or the like, but is not limited thereto and may include any type of devices capable of performing or having a computing function. However, the correction device 200 may be preferably implemented as a high-performance server-class computing device. An exemplary embodiment of the computing device will be described with reference to FIG. 9.

In addition, a function that can be additionally implemented in the correction device 200 may be implemented by utilizing an electronic device mounted in the driving vehicle 100. Accordingly, although in the exemplary embodiment illustrated in FIG. 1 the correction device 200 and the driving vehicle 100 are separated from each other, the correction device 200 can be mounted to the driving vehicle 100 so that the correction device 200 can implement the first function, the second function, and the like in the driving vehicle 100. Therefore, the present disclosure is not limited to the embodiment in which the driving vehicle 100 and the correction device 200 are separated as illustrated in FIG. 1.

However, in the present disclosure, for convenience of explanation, the driving vehicle 100 and the correction device 200 are described as separate devices each performing its own function.

In some embodiments, components included in the environment to which the correction device 200 is applied may communicate through a network. The network may be implemented as any type of wired or wireless network such as a local area network (LAN), a wide area network (WAN), a mobile radio communication network, and a Wireless Broadband Internet (Wibro).

Meanwhile, the environment illustrated in FIG. 1 illustrates that the driving vehicle 100 and the correction device 200 are connected via a network, but the scope of the present disclosure is not limited thereto, and it should be noted that the driving vehicle 100 may be connected to the correction device 200 through a peer-to-peer (P2P) network or any other connection which can connect between the driving vehicle 100 and the correction device 200.

Hereinbefore, an exemplary environment to which the corresponding device 200 according to some embodiments of the present disclosure can be applied has been described with reference to FIG. 1. Hereinafter, methods according to various embodiments of the present disclosure will be described below in detail with reference to FIG. 3.

Each step of methods to be described below may be performed by a computing device. For example, each step of the methods may be implemented with one or more instructions executed by a processor of a computing device. All steps included in these methods may be executed by one physical computing device, but, alternatively, first steps of the method may be performed by a first computing device, and second steps of the method may be performed by a second computing device.

Hereinafter, in FIG. 3, it is assumed that each step of the method is performed by the correction device 200 illustrated in FIG. 1. However, for convenience of description, the description of the operating subject of each step included in the method may be omitted.

Figure 2:
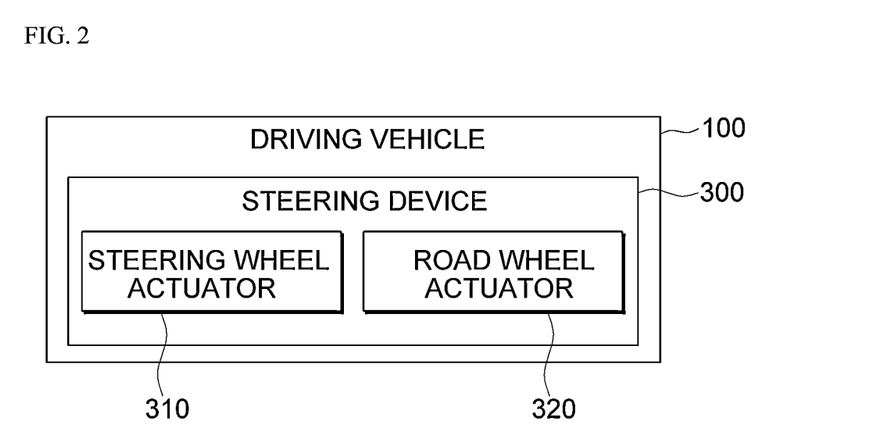
FIG. 2 is a schematic diagram for illustrating a steering device mounted to or on a driving vehicle according to an exemplary embodiment of the present disclosure.

In addition, in FIG. 2, a steering device 300 mounted to or on the driving vehicle 100 is schematically illustrated to continue the description. In the exemplary embodiment of the present disclosure, when the driver's will to steer is determined while the driving vehicle 100 is autonomously driving, the steering of the driving vehicle 100 should be corrected by reflecting the driver's will to steer. Therefore, it is intended to describe the components of the device for correcting the steering of the driving vehicle through schematic drawings, and it should be noted that the present disclosure is not intended to mainly describe the technical configuration of the steering device itself or the configuration of parts.

FIG. 2 is a schematic diagram for illustrating a steering device mounted on or to a driving vehicle according to an exemplary embodiment of the present disclosure.

The driving vehicle 100 may include a steering device 300. The steering device 300 may include one or more mechanical devices or components for steering the driving direction of the driving vehicle 100 and one or more parts configured to transmit and receive electrical signals.

The steering device 300 may transmit and receive data to and from the correction device 200 through an electrical signal, and the correction device 200 may transmit steering correction value data reflecting the driver's will to steer to the steering device 300.

The steering device 300 may steer the direction of the driving vehicle 100 according to the driver's steering while the driving vehicle 100 is driving through the driving vehicle 100, and in an autonomous driving situation without the driver's steering, the driving direction of the driving vehicle 100 may be steered according to a predetermined algorithm without the driver's intervention of the driving vehicle 10.

The steering device 300 may be, for example, but not limited to, a Steer-by-Wire (SBW) system or a steering device including the system. Here, the SBW system is an electric signal type intelligent steering system that controls the driver's will to steer by transmitting an electric signal without a mechanical connection between a steering wheel and vehicle wheels.

According to the exemplary embodiment of the present disclosure, a steering wheel actuator 310 included in the steering device 300 may be, for example, but not limited to, a steering feedback actuator, and may be an actuator configured to generate or provide a reaction force to the steering wheel.

In addition, a road wheel actuator 320 included in the steering device 300 may be, for example, but not limited to, a road wheel actuator, and may be an actuator configured to transmit a control signal associated with the driver's will to steer the vehicle to the vehicle wheels in order to rotate or move the vehicle wheels. The road wheel actuator 320 may be operably or mechanically connected to one or more vehicle wheels.

The steering wheel actuator 310 and the road wheel actuator 320 are not mechanically connected to be driven, but the steering wheel actuator 310 and the road wheel actuator 320 are driven by transmitting and receiving electrical signals to each other. Moreover, the steering wheel actuator 310 and the road wheel actuator 320 may move according to different control inputs, respectively.

Since a system of the steering wheel actuator 310 and a system of the road wheel actuator 320 should match the directions of those systems in a situation where the driving vehicle 100 is driving at high speed, one of the system of the steering wheel actuator 310 and the system of the road wheel actuator 320 can act as a main steering system of the driving vehicle 100 mainly controlling the driving vehicle 100, and the other remaining one of the system of the steering wheel actuator 310 and the system of the road wheel actuator 320 can act a non-main system. The non-main system is controlled with one or more values matching values of the main system. More specifically, when any one of the steering wheel actuator 310 and the road wheel actuator 320 acts as the main system, the main system may subordinate and control the non-main system.

When the driving vehicle 100 is not autonomously driven and the driver controls the driving vehicle 100 by steering, the road wheel actuator 320 may move by reflecting the driver's will to steer.

Meanwhile, when the driving vehicle 100 is autonomously driven, the steering wheel actuator 310 is moved by calculating the movement of the road wheel actuator 320 according to the situation of autonomous driving. Therefore, since the SBW is a system that transmits and receives electrical signals without any mechanical connection between the steering wheel and the vehicle wheel, when the driver has the steering will in an autonomous driving situation, the SBW may require an additional correction function. Therefore, it should be noted that the present disclosure relates to how to perform this additional correction function.

Hereinafter, a method of correcting the steering by reflecting the steering intention of the driver while the driving vehicle is in an autonomous driving situation will be described with reference to the flowchart of FIG. 3.

Figure 3:
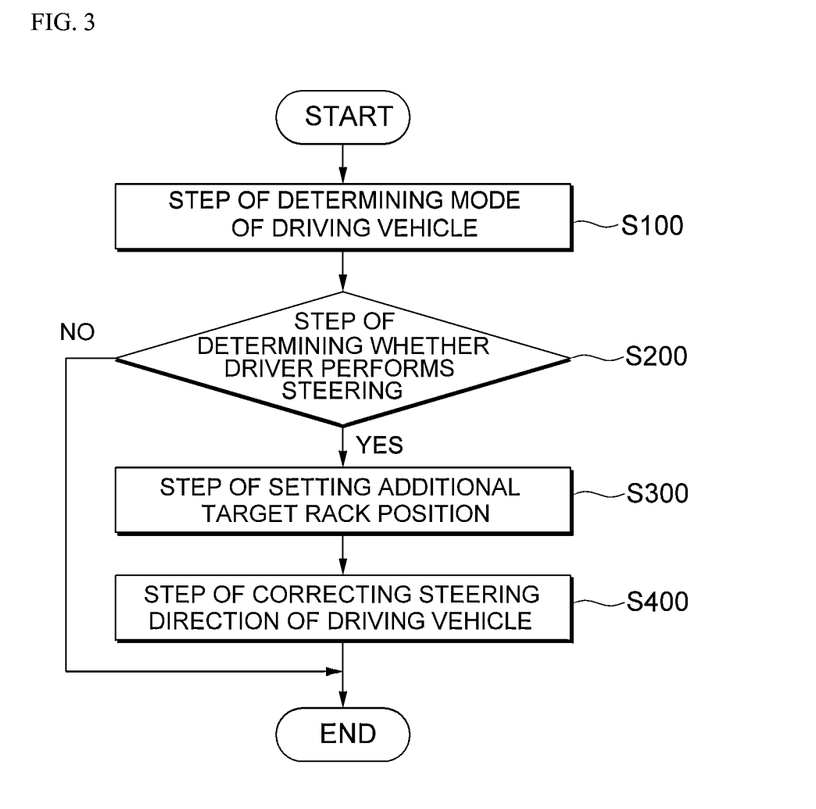
FIG. 3 is a flowchart of illustrating a method of correcting steering of a driving vehicle by reflecting a driver's will to steer the driving vehicle during autonomous driving that may be performed in a correction device according to some embodiments of the present disclosure.

FIG. 3 is a flowchart of illustrating a method of correcting steering of a driving vehicle by reflecting a driver's will to steer the driving vehicle during autonomous driving that may be performed in a correction device according to some embodiments of the present disclosure.

In FIG. 3, for convenience of explanation, a method of correcting steering of a driving vehicle in a state in which the correction device 200 is not mounted to or on the driving vehicle 100 will be described. In addition, it should be noted that, for convenience of description, the execution subject for each step may be omitted and described below, and the performing entity may be the correction device 200.

In the exemplary embodiment of the present disclosure, a process in which the correction device 200 transmits and receives to and from the driving vehicle 100 and the steering device 300 through a network from the outside of the driving vehicle 100 is described, although it is not required. That is, the correction device 200 may be mounted to or on the driving vehicle 100 to transmit and receive an electrical signal to and from the steering device 300.

The correction device 200 may determine a mode of the driving vehicle 100 in Step S100.

The mode of the driving vehicle 100 may include one or more of, for example, but not limited to, an autonomous driving mode, a normal driving mode, a remote driving mode, and any mode for driving a vehicle. Here, the normal driving mode may refer to a mode in which the driver manually drives the driving vehicle under the driver's control, and the remote driving mode refers to a mode of controlling the driving of the driving vehicle through a remote signal while the driver is on board.

In addition, the autonomous driving mode may refer to a mode in which the driving vehicle drives autonomously without driver's intervention, and the autonomous driving mode may refer to all autonomous driving modes related to the driving vehicle that can be understood by a person skilled in the art.

In the autonomous driving mode, the driving vehicle may be in a state in which the driver does not have a control right and has a control right of the driving vehicle as the driving vehicle itself.

The correction device 200 may determine the mode of the driving vehicle by using data generated from the driving vehicle 100.

In Step S200, the correction device 200 may determine whether the driver steers when the mode of the driving vehicle determined in Step S100 is the autonomous driving mode.

The correction device 200 may determine whether the driver intends to steer the driving direction with respect to the driving vehicle while the driving vehicle is driven autonomously without driver intervention. More specifically, when the driver controls a steering wheel device of the driving vehicle 100, that is, at least one of steering wheel devices of the driving vehicle 100, the correction device 200 may determine that the driver has a will to steer the vehicle. For example, when the driver intends to move the steering wheel of the driving vehicle 100 by a certain angle or more, the correction device 200 may determine that the driver intends to more steer the steering wheel, and accordingly, determine that the driver has the steering will.

Alternatively, when the driver contacts the steering wheel of the driving vehicle 100 for a predetermined period or longer, the correction device 200 may recognize this and determine that the driver intends to steer the driving vehicle 100.

Additionally, when the driver inputs any input for steering the driving vehicle to at least one device included in the driving vehicle 100, the correction device 200 may determine that the driver has the will to steer the driving vehicle.

More specifically, a detailed description for determining the driver's will to steer the driving vehicle according to the present disclosure will be described in detail with reference to FIG. 4.

Figure 4:
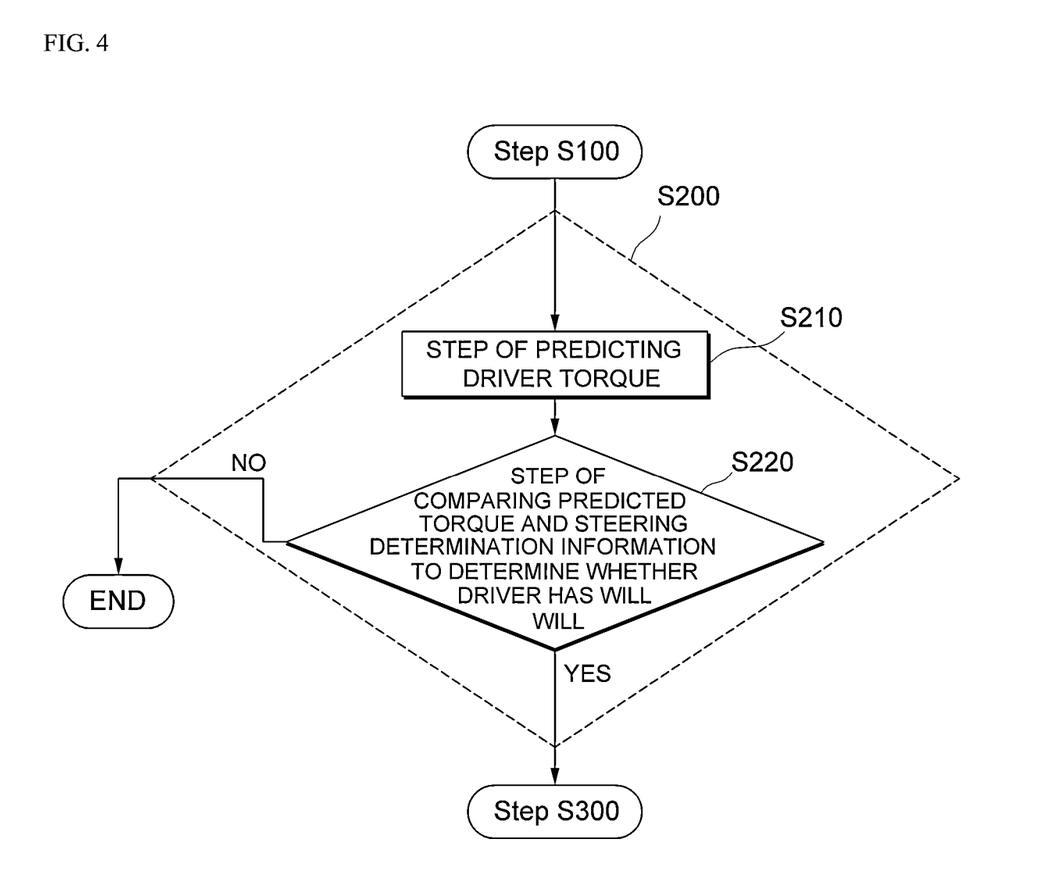
FIG. 4 is a flowchart for specifically explaining a step of determining whether a driver performs steering according to an exemplary embodiment of the present disclosure.

FIG. 4 is a flowchart for specifically explaining a step of determining whether a driver performs steering according to an embodiment of the present disclosure.

The step of determining that the driver has the will to steer the driving vehicle by the correction device 200 may include Step S210 of predicting a driver torque.

The predicting of the driver torque may mean the driver's will to steer. The driver torque may mean a constant force applied to the driving vehicle (e.g. the steering wheel) by the driver who drives the driving vehicle 100.

For instance, the driver torque may be calculated as any technical content that can be understood by a person skilled in the art predicting driver torque in an Electronic Power Steering (EPS) system.

Here, the EPS may refer to steering by a motor by improving a steering method operated by hydraulic pressure.

The EPS system may include a steering wheel, a torque sensor, a motor, an ECU, an IMS, or the like, and in all the included devices, when the driver steers the steering wheel for steering the driving vehicle, in a case where the torque sensor senses the direction and force and transmits a signal, the ECU calculates an optimal steering force according to the signal and a vehicle speed from the torque sensor to control the motor. At this time, by detecting a rotational angular speed of the motor, friction, damping, inertia, and restoration compensation can be calculated to flow the current to the motor.

When the driver rotates the steering wheel to steer the driving vehicle, a steering wheel torque is input to the ECU through the torque sensor, and a signal may be generated by combining the steering wheel torque with a vehicle speed through phase compensation control to apply current to the motor according to a preset Assist Current map.

In the EPS system, the steering torque of the driver of the driving vehicle may be applied to the wheels of the vehicle through the steering wheel torque for manipulating the steering wheel of the driving vehicle, a steering rod torque to which the steering wheel torque is applied, a steering rack force in which a road torque is applied to the vehicle wheels, and the like.

Here, the predicted driver torque may refer to at least one of the steering wheel torque steered by the driver and a road torque by which the steering wheel is manipulated when the steering wheel torque steered by the driver is applied to the steering wheel. The predicting of the driver torque may have an error of a certain value from an actual value.

Certain exemplary embodiments of the present disclosure relate to a method of using the calculated driver torque rather than a method of specifically calculating the driver torque itself, and thus, it should be noted that any method that can be understood by a person skilled in the art may be applied.

In Step S220, the correction device 200 may determine whether the driver has the steering will by comparing the predicted driver torque with steering determination information. For example, the steering determination information may be information serving as a reference for determining the driver's will to steer, and may include a threshold torque amount, a threshold torque duration, and the like. A detailed process for determining the driver's will to steer using the steering determination information in the correction device 200 will be described in detail with reference to FIGS. 5 and 6.

Figure 5:
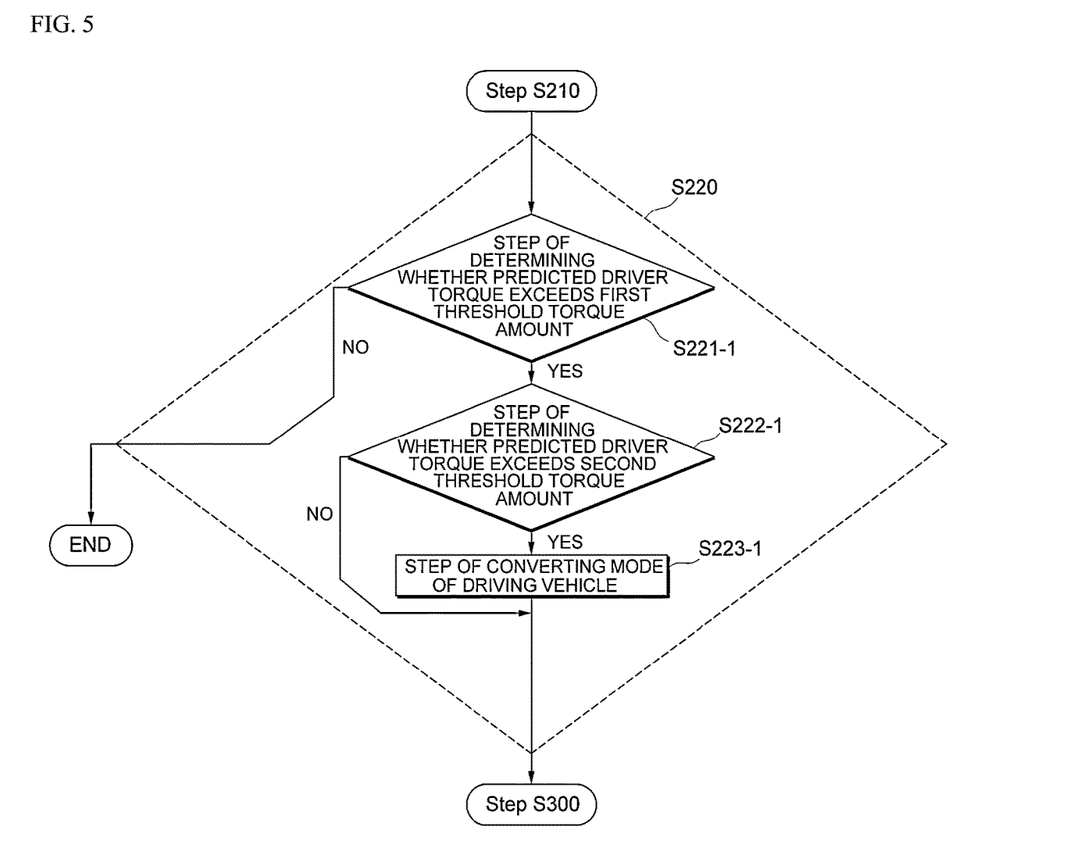
FIG. 5 is a flowchart for explaining sub-steps included in a step of determining whether a driver has a steering will by comparing a predicted torque with steering determination information according to an exemplary embodiment of the present disclosure.

FIG. 5 is a flowchart for explaining sub-steps included in the step of determining whether the driver has the steering will by comparing the predicted torque with the steering determination information according to an exemplary embodiment of the present disclosure.

In Step S221-1, the correction device 200 may determine whether the predicted driver torque exceeds a first threshold torque amount by comparing the predicted driver torque described above with reference to FIG. 5 and the first threshold torque amount. For example, the first threshold torque amount may be a preset torque value applied by the driver, and the first threshold torque amount should not be interpreted to be limited to a specific value.

Moreover, the first threshold torque amount and a second threshold torque amount to be described later are preset torque amounts and may be set to be any value. However, the first and second threshold torque amounts may be torque amounts greater than or equal to a predetermined amount corresponding to a steering column friction force. More specifically, the threshold torque amount may be a constant torque amount corresponding to a friction force generated in an operation process for the steering wheel torque applied by the driver in a steering wheel steering device including the SBW or EPS in the steering device or a steering wheel road torque generated by applying the steering wheel torque or handling torque.

When the predicted driver torque is higher than the first threshold torque amount, the correction device 200 may determine whether the predicted driver torque exceeds the second threshold torque amount (Step S222-1). Here, the second threshold torque amount may be set to be higher than the first threshold torque amount.

In Step S223-1, when the predicted driver torque is higher than the second threshold torque amount, the correction device 200 may change the mode of the driving vehicle.

For example, when the predicted driver torque exceeds the second threshold torque amount in a case where the driving vehicle 100 is in autonomous driving mode, the correction device 200 determines that the driver's will to steer the driving vehicle 100 is very high when the torque applied to the driving vehicle 100 is very high, and changes the mode of the driving vehicle from the autonomous driving mode to the normal driving mode in which the driver has control of the driving vehicle. Accordingly, the second threshold torque amount may be much higher than the above-described first threshold torque amount.

In this case, in Step S223-1, when the correction device 200 changes the mode of the driving vehicle, it may mean that the mode of the driving vehicle is changed from the autonomous driving mode to the normal driving mode. Here, the normal driving mode may mean a mode in which the driver has control of the driving vehicle.

That is, through Step S223-1, when it is determined that the driver's will to steer the driving vehicle is strong, the correction device 200 not only corrects the steering of the driving vehicle, but also changes the mode of the driving vehicle and transfers the control right of the driving vehicle to the driver, and thus, it is possible to secure more driving convenience and safety for the driver.

Returning to Step S222-1, when the predicted driver torque does not exceed the second threshold torque amount, the correction device 200 determines that the driver has the steering will, and performs Steps S300 and S400 in FIG. 3. That is, when the predicted driver torque has a value between the first threshold torque amount and the second threshold torque amount, the correction device 200 may determine that the driver has the steering will.

Figure 6:
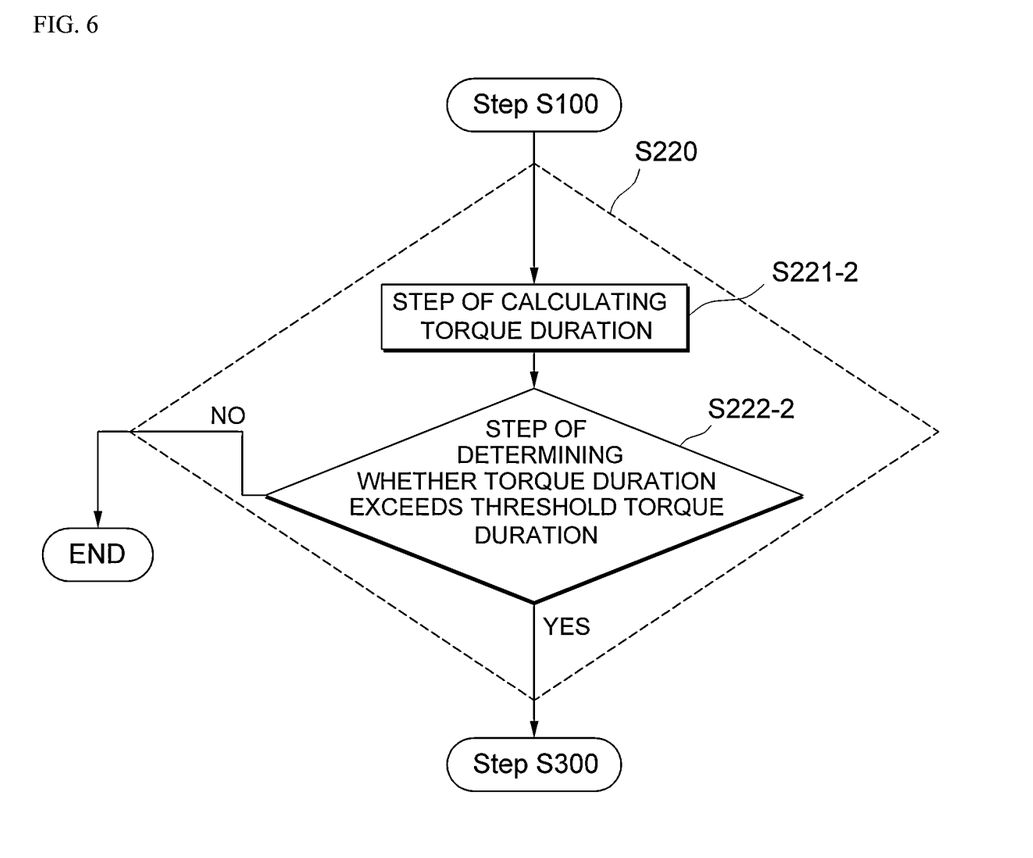
FIG. 6 is a flowchart for explaining sub-steps included in another embodiment of the step of determining whether the driver has the steering will by comparing the predicted torque with the steering determination information.

Hereinafter, the step of determining the driver's will to steer the driving vehicle based on a torque duration included in the steering determination information will be described.

FIG. 6 is a flowchart for explaining sub-steps included in another embodiment of the step of determining whether the driver has the steering will by comparing the predicted torque with the steering determination information.

In Step S221-2, the correction device 200 may calculate a torque continuance duration to determine the driver's will to steer the driving vehicle. Accordingly, the driver's torque continuance duration may determine the driver's will to steer the driving vehicle by calculating a continuance time duration for which the torque applied by the driver is applied. For example, when the torque applied by the driver continues for a very short time, the correction device 200 may determines that the driver does not intend to steer the driving vehicle. Moreover, when the duration of the torque applied by the driver is not short, the correction device 200 may determines that the driver intends to steer the driving vehicle.

In Step S222-2, the correction device 200 may determine whether the torque continuance duration exceeds a threshold torque duration. As described above, when the torque continuance duration applied by the driver is shorter than the threshold torque duration, the correction device 200 may determines that the driver does not apply the torque with the steering will, and when the torque continuance duration applied by the driver is longer than the threshold torque duration, the correction device 200 may determine that the driver has the steering will.

Returning to FIG. 3 again, in Step S300, the correction device 200 may set an additional target rack position. When it is determined that the driver intends to steer the driving vehicle 100, the correction device 200 may set an additional correction value for the position of the rack.

The additional target rack position may be a correction value for additionally correcting the position of the rack, and the correction value may be an input value that reflects the driver's will to steer the driving vehicle and is transmitted to a road wheel actuator.

In addition, the correction value transmitted to the road wheel actuator may be the calculated additional target rack position value. Accordingly, through this, when the driver has the steering will, the correction value may be transmitted by reflecting this.

The rack may be one of steering devices using a small gear (pinion) and a round bar (rack) with teeth in a steering wheel device of a driving vehicle. For example, the pinion may be attached to the end of a steering shaft, the rack may be engaged with this pinion, and thus, when the steering wheel is turned, the rack moves left or right. The movement of the rack is transmitted to the wheels through a tie rod, and thus, directions of the wheels can be changed left or right.

The additional target rack position may be related to a compensation value of the movement of the rack which reflects the driver's will to steer the driving vehicle.

For example, the additional target rack position can be calculated by dividing the driver's torque by the torsion bar stiffness and multiplying by a C-factor/360 value.

The C-factor provides a difference in handling responsiveness and may represent the movement rate of the rack. The C-factor can have various values depending on a steering angle, and in a torsion bar, the stiffness of the torsion bar may cause a difference in handling responsiveness. In addition, the C-factor can be used by being implemented as a function according to the vehicle speed of the driving vehicle.

More specifically, the C-factor may be, or be associated with, a distance moved or traveled when the gear rotates one revolution (360°) in the rack and the pinion which is a small gear in the steering device. For example, the C-factor may mean a distance (mm) that the rack moves during one revolution of the steering wheel.

As an example, the stiffness of the torsion bar stiffness may mean torsional stiffness between a torque applied to an axis and a torsion angle. Accordingly, the stiffness of the torsion bar may be a fixed constant value.

The torsion bar stiffness and the C-factor may be concepts that can be calculated or varied within a range that can be understood by a person skilled in the art related to the steering device and the steering wheel device of the driving vehicle.

When the correction device 200 determines that the driver has no steering will, the correction device 200 may omit and may not perform the step of setting the additional target rack position. Specifically, as described above, in the case where the predicted torque exceeds the second threshold torque amount, when the torque continuance duration is shorter than the threshold torque duration, it is determined that the driver has no steering will, and the step of setting the additional target rack position may not be performed.

In Step S400, when the additional target rack position is set, the correction device 200 may correct the steering direction of the driving vehicle 100 based on the set correction value. The driving direction may be steered by using the steering device mounted to or on the driving vehicle 100, and more specifically, the correction device 200 may steer the direction of the driving vehicle 100 through an electrical signal by transmitting the electrical signal to the steering device of the driving vehicle 100. Through this, when the driving vehicle 100 is in an autonomous driving situation, the correction device 200 may correct the steering of the driving vehicle 100 by reflecting the driver's will to steer the driving vehicle 100. Hereinafter, a method performed by the correction device 200 according to certain embodiments of the present disclosure will be described in detail based on an exemplary driving diagram.

Figure 7:
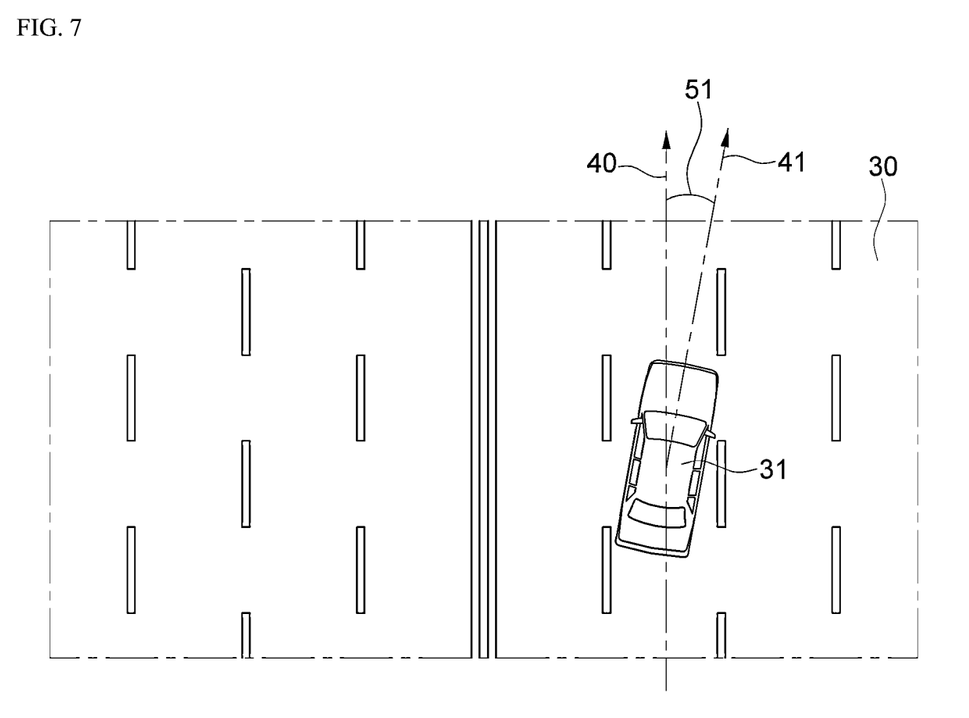
FIG. 7 is an example of driving a driving vehicle in association with a driver's driver torque according to some embodiments of the present disclosure.

FIG. 7 shows an example of driving a driving vehicle in association with a driver's driver torque according to some embodiments of the present disclosure.

In FIG. 7, a case in which, when a driving vehicle 31 travels in a driving direction 40 on a road 30, the correction device 200 detects the driver's will to steer the driving vehicle 31 may be described.

The example shown in FIG. 7 can be a case in which a driver torque is applied to the driving vehicle 31 in a first steering direction 41 which is different from, or spaced apart, the driving direction 40 by a first steering angle 51. In this example, the driver applies the driver torque in the first steering direction 41 with a steering will to the driving vehicle 31. The first steering angle 51 may mean a direction angle (or a difference) between the first steering direction 41 and the driving direction 40 of the driving vehicle 31.

In this example, the additional target rack position may mean a correction value applied to allow the driving vehicle 31 to drive in the driving direction 40 rather than steering the driving vehicle 31 in the first steering direction 41 when the driver applies the driver torque in the first steering direction 41. Through this, even when it is determined that the driver has the steering will with respect to the driving vehicle 31, the direction may be corrected for driving safety of the driving vehicle 31 to assist the autonomous driving mode of the driving vehicle 31.

Moreover, in this case, the additional target rack position may steer the driving vehicle 31 in the first steering direction 41 when the driver applies driver torque in the first steering direction 41. This is to determine that the driver intends to steer or drive the driving vehicle 31 in the driving direction 41 of the driving vehicle 31 with the steering will, and at this time, it may also assist the driving vehicle 31 to drive on the road 30 without any sense of difference.

Figure 8:
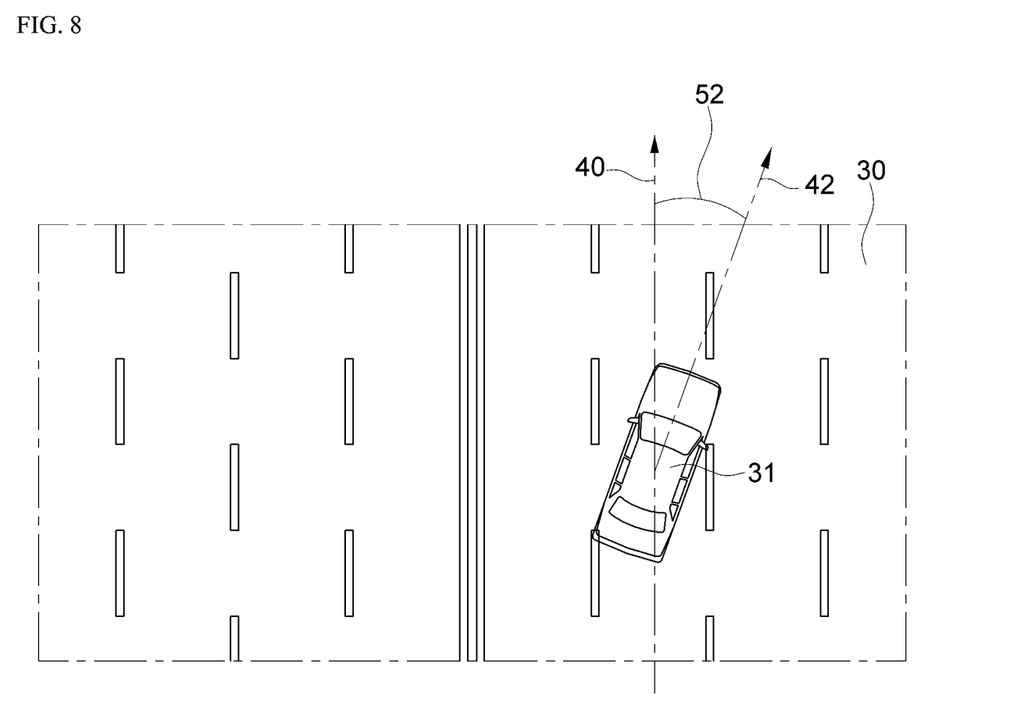
FIG. 8 illustrates another example of driving a driving vehicle in association with a driver's driver torque according to some embodiments of the present disclosure.

FIG. 8 illustrates another example of driving a driving vehicle in association with a driver's driver torque according to some embodiments of the present disclosure.

In FIG. 8, another example in which, when the driving vehicle 31 drives in the driving direction 40 on the road 30, the correction device 200 has the driver's will to steer the driving vehicle 31 is described.

This example shown in FIG. 8 can be a case in which a driver torque is applied to the driving vehicle 31 in a second steering direction 42 which is different from, or spaced apart, the driving direction 40 by a second steering angle 52. In this example, the driver applies the driver torque in the second steering direction 42 with a steering will to the driving vehicle 31. The second steering angle 52 may mean a direction angle (or a difference) between the first steering direction 42 and the driving direction 40 of the driving vehicle 31.

Unlike the example of FIG. 7, in this example, the additional target rack position is set to 0, it is determined that the steering will of the driver with respect to the driving vehicle 31 is strong, and the vehicle mode of the driving vehicle 31 is changed from the autonomous driving mode to the normal driving mode.

That is, when the driver applies the driver torque in the second steering direction 42, it is determined that the steering will of the driver who intends to steer the driving vehicle 31 in the second steering direction 42 is strong, the driving mode of the driving vehicle 31 is changed to a mode in which the driver has control of the driving vehicle 31, which is the normal driving mode, so that the driving vehicle 31 can drive in the second steering direction 42. Accordingly, the driving vehicle 31 may be driven in the second steering direction 42 by the driver's will.

Hereinafter, a system to which some embodiments of the present disclosure can be applied will be described using FIG. 9.

Figure 9:
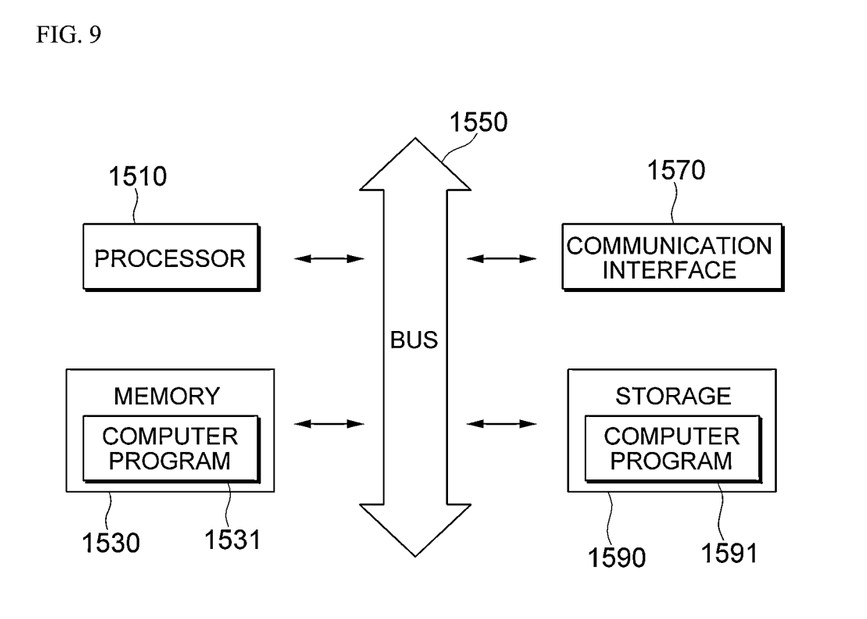
FIG. 9 is a block diagram of a computing device that may implement devices and/or systems in accordance with various embodiments of the present disclosure.

FIG. 9 is a block diagram of a computing device that may implement devices and/or systems in accordance with various embodiments of the present disclosure.

One or more components included in a computing device 150 can be comprised in the driving vehicle 100 or 31 and/or the correction device 200.

A computing device 1500 may include at least one processor 1510, a bus 1550, a communication interface 1570, a memory 1530 for loading a computer program 1591 executed by the processor 1510, and a storage 1590 for storing the computer program 1591. However, only the components related to the embodiment(s) of the present disclosure are illustrated in FIG. 9. Accordingly, those skilled in the art to which the present disclosure pertains can understand that general-purpose components other than the components illustrated in FIG. 9 may be further included.

The processor 1510 controls the overall operation of each component of the computing device 1500. The processor 1510 may include a central processing unit (CPU), a micro processor unit (MPU), a micro controller unit (MCU), a graphic processing unit (GPU), or any type of processor known in the art of the present disclosure. In addition, the processor 1510 may perform an operation on at least one application or program for executing the method according to the embodiments of the present disclosure. The computing device 1500 may include one or more processors.

The memory 1530 stores various data, instructions and/or information. The memory 1530 may load one or more programs 1591 from the storage 1590 to execute a method according to embodiments of the present disclosure. The memory 1530 may be implemented as a volatile memory such as RAM, but the technical scope of the present disclosure is not limited thereto.

The bus 1550 provides communication functions between components of the computing device 1500. The bus 1550 may be implemented as various types of buses, such as an address bus, a data bus, and a control bus.

The communication interface 1570 supports wired and/or wireless communication (e.g. Internet communication) of the computing device 1500. Also, the communication interface 1570 may support various communication methods other than Internet communication. To this end, the communication interface 1570 may include a communication module known in the technical field of the present disclosure.

According to some embodiments of the present disclosure, the communication interface 1570 may be omitted.

The storage 1590 may non-temporarily store the one or more programs 1591 and various data.

The storage 1590 may include a non-volatile memory such as a read only memory (ROM), an erasable programmable ROM (EPROM), an electrically erasable programmable ROM (EEPROM), and a flash memory, a hard disk, a removable disk, non-transitory computer-readable medium, or any type of computer-readable recording medium known in the art to which the present disclosure pertains.

The computer program 1591 may include one or more instructions that, when loaded into the memory 1530, cause the processor 1510 to perform methods or operations according to various embodiments of the present disclosure. That is, the processor 1510 may perform the method or operations according to various embodiments of the present disclosure by executing one or more instructions.

Hereinbefore, various embodiments of the present disclosure and effects according to the embodiments have been described with reference to FIGS. 1 to 9. Effects according to the technical spirit of the present disclosure are not limited to the above-mentioned effects, and other effects not mentioned will be clearly understood by those skilled in the art from the description of the specification.

The technical idea of the present disclosure described with reference to FIGS. 1 to 9 may be implemented as computer-readable codes on a computer-readable medium. The computer-readable recording medium may be, for example, a removable recording medium (CD, DVD, Blu-ray disk, USB storage device, removable hard disk) or a fixed recording medium (ROM, RAM, computer-equipped hard disk). The computer program recorded in the computer-readable recording medium may be transmitted to another computing device through a network such as the Internet and installed in the other computing device, thereby being used in the other computing device.

In the above, even though all components constituting the embodiment of the present disclosure are described as being combined or operated in combination, the technical spirit of the present disclosure is not necessarily limited to this embodiment. That is, within the scope of the present disclosure, all the components may operate by selectively combining one or more.

Although acts are illustrated in a particular order in the drawings, it should not be understood that the acts must be performed in the specific order or sequential order illustrated, or that all depicted acts must be performed to obtain a desired result. In certain circumstances, multitasking and parallel processing may be advantageous. Moreover, the separation of various components in the embodiments described above should not be construed as necessarily requiring such separation, and it should be understood that the program components and systems described may generally be integrated together into a single software product or packaged into multiple software products.

Although embodiments of the present disclosure have been described above with reference to the accompanying drawings, those of ordinary skill in the art to which the present disclosure pertains may implement the present disclosure in other specific forms without changing the technical spirit or essential features. Therefore, it should be understood that the embodiments described above are illustrative in all respects and not restrictive. The protection scope of the present disclosure should be interpreted by the following claims, and all technical ideas within the scope equivalent thereto should be interpreted as being included in the scope of the technical ideas defined by the present disclosure.

What is claimed is:

1. A method performed by a processor of an apparatus of correcting steering of a driving vehicle, the method comprising:
    detecting a current driving mode of the driving vehicle among a plurality of driving modes;
    determining whether a driver performs the steering of the driving vehicle when the detected current driving mode of the driving vehicle is an autonomous driving mode, wherein the determining of whether the driver performs the steering of the driving vehicle includes calculating a duration of a torque applied by the driver, and predicting a driver torque and comparing the predicted the driver torque with a first threshold torque;
    determining that the duration of the torque applied by the driver exceeds a threshold torque duration;
    when the duration of the torque applied by the driver exceeds the threshold torque duration, setting an additional target rack position based on a torsion bar stiffness, wherein the additional target rack position is input to a road wheel actuator connected to one or more vehicle wheels,
    if the predicted driver torque exceeds the first threshold torque and does not exceed a second threshold torque greater than the first threshold torque, maintaining the autonomous driving mode, setting the additional target rack position for changing a position of a rack according to the driver's steering, and
    correcting a steering direction of autonomous driving of the driving vehicle according to the target rack position set according to the additional driver's steering, and
    if the predicted driver torque exceeds both the first threshold torque and the second threshold torque, changing the mode of the driving vehicle from the autonomous driving mode and setting the additional target rack position input to the road wheel actuator to zero (0).

2. The method of claim 1, wherein:
    the determining of whether the driver has the steering will comprise, when the predicted driver torque exceeds the second threshold torque amount, determining that the driver has the steering will, and
    the method further comprises, when the predicted driver torque exceeds the second threshold torque amount, changing the current driving mode of the driving vehicle.

3. The method of claim 1, wherein the determining of whether the driver has the steering will comprises, when the predicted driver torque exceeds the first threshold torque amount, determining that the driver has the steering will.

4. The method of claim 1, wherein the determining of whether the driver has the steering will comprises, when the predicted driver torque does not exceed the second threshold torque amount, determining that the driver has the steering will.

5. The method of claim 1, wherein when it is determined that the driver has the steering will, the target rack position input to the road wheel actuator is set based on a torsion bar stiffness.

6. The method of claim 5, wherein the target rack position input to the road wheel actuator is calculated by dividing a torque applied by the driver by the torsion bar stiffness.

7. The method of claim 6, wherein the target rack position input to the road wheel actuator is calculated by multiplying a C-factor.

8. The method of claim 1, wherein the determining of whether the driver has the steering will includes calculating a duration of a torque applied by the driver.

9. The method of claim 8, wherein the determining of whether the driver has the steering will further includes determining whether the duration of the torque applied by the driver exceeds a threshold torque duration.

10. The method of claim 9, wherein the determining of whether the driver has the steering will comprises, when the duration of the torque applied by the driver exceeds the threshold torque duration, determining that the driver has the steering will.

11. An apparatus of correcting steering of a driving vehicle associated with autonomous driving, the apparatus comprising:
    a processor;
    a memory storing instructions executable by the processor; and wherein the processor is configured to:
  detect a current driving mode of the driving vehicle among a plurality of driving modes, determine whether a driver performs the steering of the driving vehicle when the detected current driving mode of the driving vehicle is an autonomous driving mode, wherein the determining of whether the driver performs the steering of the driving vehicle includes calculating a duration of a torque applied by the driver, and predicting a driver torque and comparing the predicted the driver torque with a first threshold torque,
  if the duration of the torque applied by the driver exceeds a threshold torque duration, set an additional target rack position based on a torsion bar stiffness, wherein the additional target rack position is input to a road wheel actuator connected to one or more vehicle wheels,
  if the predicted driver torque exceeds the first threshold torque and does not exceed a second threshold torque greater than the first threshold torque, maintain the autonomous driving mode, set the additional target rack position for changing a position of a rack according to the driver's steering, and correct a steering direction of autonomous driving of the driving vehicle according to the additional target rack position set according to the driver's steering, and
  if the predicted driver torque exceeds both the first threshold torque and the second threshold torque, change the mode of the driving vehicle from the autonomous driving mode and set the additional target rack position input to the road wheel actuator to zero (0).

12. The apparatus of claim 11, wherein the processor is configured to, when the predicted driver torque exceeds the second threshold torque amount, determine that the driver has the steering will and change the current mode of the driving vehicle.

13. The apparatus of claim 11, wherein the processor is configured to, when the predicted driver torque exceeds the first threshold torque amount, determine that the driver has the steering will.

14. The apparatus of claim 11, wherein the processor is configured to, when the predicted driver torque does not exceed the second threshold torque amount, determine that the driver has the steering will.

15. The apparatus of claim 11, wherein the processor is configured to, when it is determined that the driver has the steering will, set the target rack position input to the road wheel actuator based on a torsion bar stiffness.

16. The apparatus of claim 15, wherein the processor is configured to calculate the target rack position input to the road wheel actuator by dividing a torque applied by the driver by the torsion bar stiffness.

17. The apparatus of claim 16, wherein the processor is configured to calculate the target rack position input to the road wheel actuator by multiplying a C-factor.

18. The apparatus of claim 11, wherein the processor is configured to calculate a duration of the torque applied by the driver.

19. The apparatus of claim 18, wherein the processor is configured to determine whether the duration of the torque applied by the driver exceeds a threshold torque duration.

20. The apparatus of claim 19, wherein the processor is configured to, when the duration of the torque applied by the driver exceeds the threshold torque duration, determine that the driver has the steering will.

* * * * *